United States Patent [19]

Koike

[11] Patent Number: 5,309,419
[45] Date of Patent: May 3, 1994

[54] M-O DISK RECORDING APPARATUS WITH LIGHT AMOUNT CONTROL BASED ON MULTIPLE TEST PERFORMED ON A TEST REGION AT MULTIPLE DISK ROTATIONAL VELOCITIES

[75] Inventor: Shigeaki Koike, Kanagawa, Japan

[73] Assignee: Sony Corporation, Tokyo, Japan

[21] Appl. No.: 15,909

[22] Filed: Feb. 10, 1993

[30] Foreign Application Priority Data

Feb. 14, 1992 [JP] Japan .................................. 4-028457

[51] Int. Cl.$^5$ .............................................. G11B 7/00
[52] U.S. Cl. ........................................ 369/54; 369/50; 369/58; 369/116
[58] Field of Search ................ 369/47, 50, 54, 58, 369/109–111, 116

[56] References Cited

U.S. PATENT DOCUMENTS 4,631,713 12/1986 Romeas et al. ..................... 369/54
5,070,495 12/1991 Bletscher, Jr. et al. ............. 369/116
5,134,606 7/1992 Sekiguchi et al. ................. 369/54 X
5,185,733 2/1993 Finkelstein et al. ................ 369/54
5,226,027 7/1993 Baky .................................. 369/54 X
5,233,584 8/1993 Kulakowski et al. .............. 369/54 X Primary Examiner—W. R. Young
Attorney, Agent, or Firm—Lewis H. Eslinger; Jay H. Maioli

[57] ABSTRACT

To determine the optimum recording light amounts for all recordable regions of each optical disk in a relatively short time, information is recorded on the try-to-write region 4 on the inside of the innermost periphery of the rewritable region 2 of the optical disk 1 while rotating it at linear velocities equal to the recording velocities of at least two positions (radii R1, R2) in the radius direction A within the rewritable region 2, and the optimum recording light amounts are measured. Then, the optimum recording light amounts for all velocities in the rewritable region 2 are determined by an interpolation or extrapolation processing 26 of the measured optimum recording light amounts at the two velocities.

18 Claims, 5 Drawing Sheets

FIG. 2
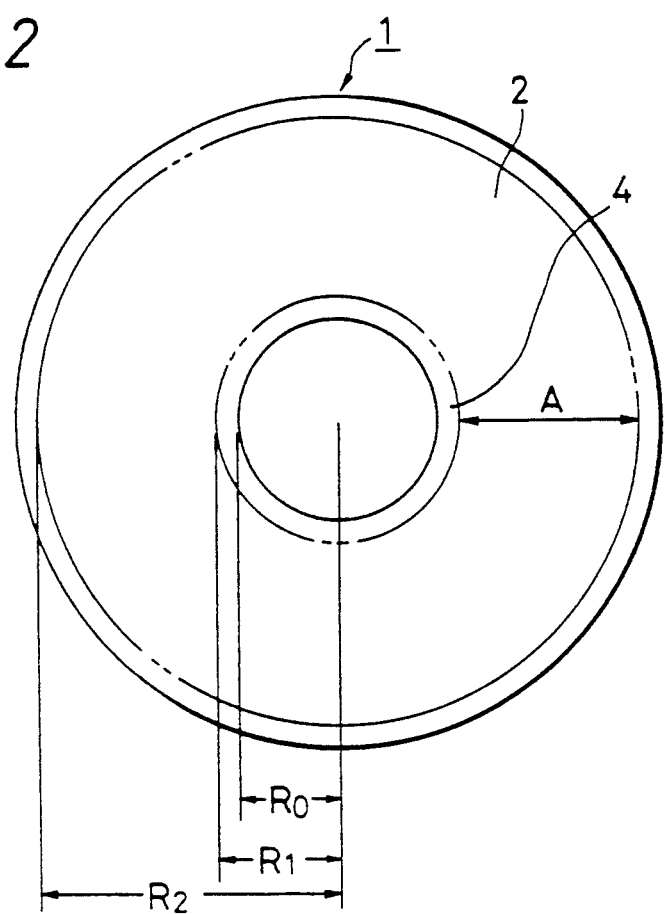
FIG. 3 Content of Velocity Command Table
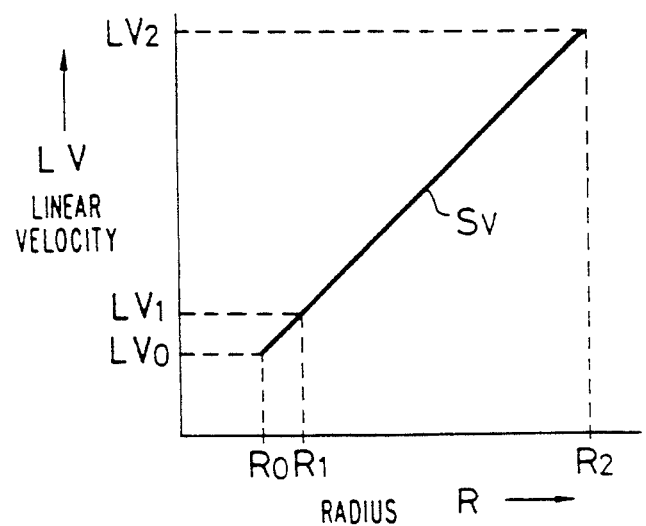

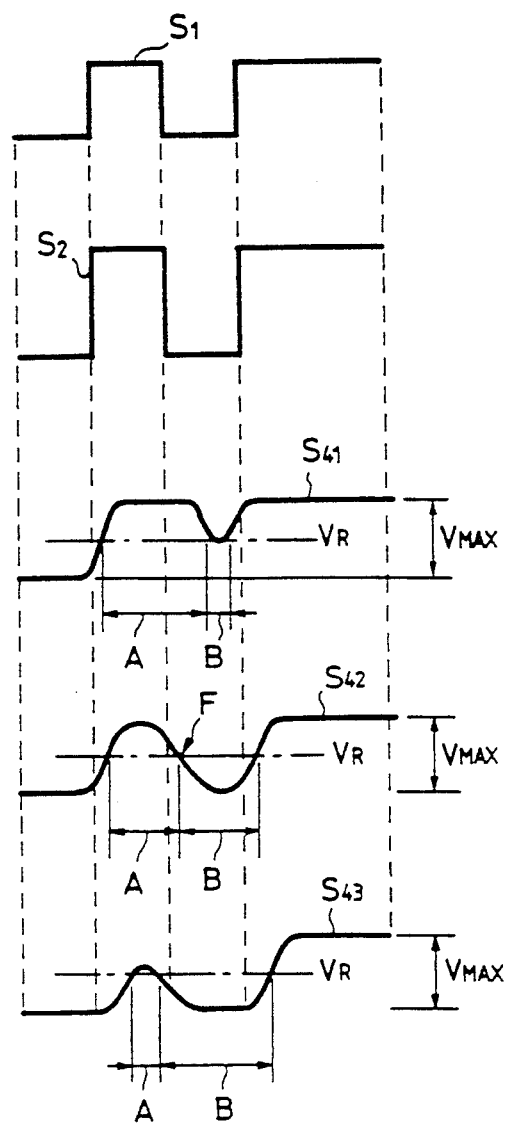
Waveforms of Recording Signal and Reproduced Signal
FIG. 4A Reference Recording Signal
FIG. 4B Recording Signal
FIG. 4C Reproduced Signal (Large Light Amount)
FIG. 4D Reproduced Signal (Optimum Light Amount)
FIG. 4E Reproduced Signal (Small Light Amount)

M-O DISK RECORDING APPARATUS WITH LIGHT AMOUNT CONTROL BASED ON MULTIPLE TEST PERFORMED ON A TEST REGION AT MULTIPLE DISK ROTATIONAL VELOCITIES

BACKGROUND OF THE INVENTION

1. Field of the Invention

This invention relates to an apparatus and method for recording optical disks, both those suitable for recording and those suitable upon reproduction, for example, reversible-type optical disks capable of being repetitively recorded and reproduced, or write-once type disks.

2. Description of Prior Art

When recording such disks, pits (or marks) are formed on a repetitively recordable and reproducible optical disk, or a write-once read-many type optical disk, and the amount of laser light to be irradiated on the optical disk, the amount of recording light, has to be maintained to be a proper value. This is because the recorded pits are required to have a uniform shape and a high density in order to reduce error upon reproduction and improve the recording density.

According to the prior art, in order to set the amount of recording light at a proper value, a "try-to-write" region is prepared on a track within a predetermined user's recordable region of the optical disk, and the user confirms the proper amount of recording light within this try-to-write region.

When information is recorded at the confirmed proper amount of recording light, the recording density of a recorded region near the try-to-write region can be improved since a relatively small error occurs upon reproduction.

However, when a video signal is recorded over the whole disk, i.e. the innermost to outermost periphery of the user's recordable region of the optical disk, the amount of recording light, even if it is set to be a proper value within the try-to-write region as mentioned above, diverges from the proper amount at other tracks away from that region because the linear velocity of the recording medium (which depends on the radius of the track) is considerably different from that within the try-to-write region. This limits the high-density recordability.

Increasing the amount of testing, however tends to occupy more time and thus be inefficient. Also, although it has been proposed to provide a test area in every sector and test at every radius (e.g. in computers WD2000 and WD3000) this reduces the amount of available storage area and so is unsuitable for video disks where more data is generally stored than on a computer disk.

OBJECTS AND SUMMARY OF THE INVENTION

This invention, in view of this problem, is to provide an apparatus and method for recording optical disks which are capable of determining the optimum recording conditions of the user's recordable region of individual optical disks in a relatively short time.

According to this invention, there is provided optical disk recording apparatus comprising:

a disk drive for rotating an optical disk;

a light source for recording information on the optical disk;

recording light amount control means for controlling the amount of light emitted by the light source during recording;

reproduction means for reproducing recorded information to produce a reproduced signal;

system control means for controlling said light source and light amount control means to record first and second test data in a predetermined test region of the disk while controlling the disk drive to rotate the disk during recording of said first and second test data at respective first and second different angular velocities such that the linear velocities of the test region at said first and second angular velocities are equal to the linear velocities of two different radial positions of the disk during information recording, and for controlling the reproduction means to reproduce the first and second text data and for determining respective first and second optimized recording light amounts in accordance with the reproduced first and second test data;

the system control means comprising computing means for computing light recording amounts for all other desired radial positions on the disk from the first and second optimized recording light amounts; and means for setting the recording light amount to be used in information recording in accordance with the reproduced test data.

There is also provided an optical disk recording method comprising the steps of:

recording first and second test data on a test region of an optical disk using a light source while rotating the disk during recording of said first and second test data at respective first and second different angular velocities such that the linear velocities of the test region undergoing recording are equal to the linear velocities of two different radial positions of the disk to be used during information recording;

reproducing the test data;

determining respective first and second optimized recording light amounts in accordance with the reproduced first and second test data;

computing light recording amounts for all other desired radial positions on the disk from the first and second optimized recording light amounts; and setting the recording light amount of the light source for information reading according to the test data, first and second optimized light recording amounts and computed light recording amounts.

Thus with the invention, information may be recorded on the try-to-write region on the inside of the innermost periphery of the user's recordable region of the optical disk while rotating it at the first and second linear velocities equal to those at two points in the radius direction of the user's recordable region and with first and second amounts of recording laser beam under the control of the recording light amount control means. Then, the first and second recording light amounts optimized at the first and second linear velocities in the try-to-write region of the optical disk can be obtained by the reproduction means 22, comparing means 23 and optimizing means 25. Also, the values of the recording light amounts at all points in the radial direction in the recordable region are determined by computing means on the basis of the optimized first and second recording light amounts. Therefore, the optimum recording light amount for all points in the user's recordable region of each optical disk can be determined in a relatively short time.

The computing means may determine the other recording light amounts by interpolation and/or extrapolation based on a function selected according to the properties of the disk, e.g. selected to model the properties of tested disks.

The invention is applicable to write-once disks as well as rewritable disks.

BRIEF DESCRIPTION OF THE DRAWINGS

FIG. 3 is a diagram showing the contents of the velocity command table stored in the system controller of the optical disk recording and reproducing apparatus shown in FIG. 1;

FIG. 4(A-E) is a waveform diagram to which reference is made in explaining the operation of the optical disk recording and reproducing apparatus shown in FIG. 1;

DESCRIPTION OF PREFERRED EMBODIMENTS

An illustrative embodiment of the optical disk recording apparatus to which the optical disk recording method of the invention is applied will now be described with reference to the drawings.

Figure 1:
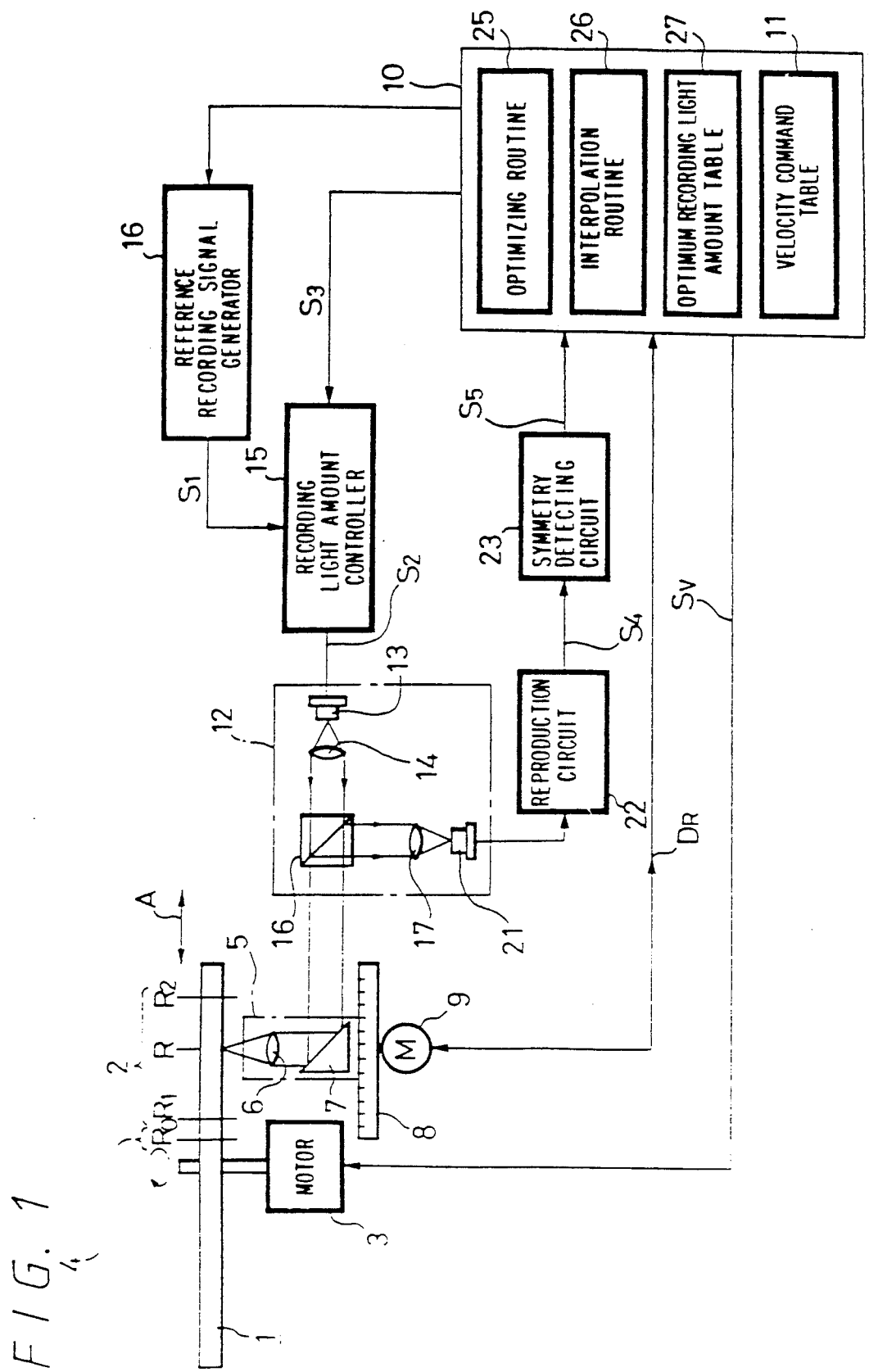
FIG. 1 is a diagram of the construction of the optical disk recording and reproducing apparatus of one embodiment of the optical recording apparatus of the FIG. 2 is a plan view of the optical disk of the optical disk recording and reproducing apparatus shown in FIG. 1.

FIG. 1 is a schematic diagram of an embodiment of the optical disk recording apparatus of the invention. FIG. 2 is a plan view of an optical disk to be recorded by this apparatus.

Referring to FIGS. 1 and 2, there is shown an optical disk 1. This optical disk 1 has a rewritable region 2 as the user's recordable region. This rewritable region 2 is an annular region extending from radius $R_1$ to $R_2$. A try-to-write region 4 is formed on the inside of the innermost periphery of the rewritable region 2. This try-to-write region 4 is an annular region extending from radius $R_0$ to $R_1$. The type of optical disk 1 is not limited to the rewritable optical disk, but may be a write-once type optical disk.

An optical pickup 5 is located to face the disk surface of this optical disk 1 in order to write pits or read the recorded pits. The optical pickup 5 has an object lens 6 and a mirror 7, and it is moved along a guide rail 8 in the radius direction A of the optical disk 1 by a feeding mechanism that is formed of a feeding motor 9 and so on.

The position of the optical pickup 5 in the radius direction A, or the radius R is read as radius data $D_R$ by an encoder connected to the rotating shaft of a spindle motor 3. The radius data is supplied to a system controller 10. The system controller 10 responds to the radius $D_R$ from the encoder to control the feeding mechanism so that the optical pickup 1 can be moved to a predetermined radius R specified by the radius-position specifying data which the system controller 10 itself generates.

This optical disk 1 is rotated at a constant angular velocity (CAV) by the spindle motor 3 under the control of a speed command signal $S_v$ from the system controller 10. Therefore, since the linear velocity LV at a predetermined radius R is determined by the product of the radius R and the angular velocity, it is proportional to the radius R. FIG. 3 shows the contents of a velocity command table 11 stored in the system controller 10 in association with this velocity command signal $S_v$.

As shown in FIG. 1, a fixed optical system 12 is optically connected to the pickup 5 that is moved in the radius direction A. The fixed optical system 12 has a laser diode 13 which is controlled to emit a laser beam according to the optical modulation system. The laser diode 13 is connected to a recording light amount control circuit 15 as the means for controlling the amount of recording light. This recording light amount control circuit 15 suppplies a recording signal $S_2$ (see FIG. 4B) of a modulating current signal to the laser diode 13. The amplitude of the recording signal $S_2$ is determined by a control signal $S_3$ that is fed from the system controller 10. The on-period and off-period of the recording signal $S_2$ are determined by a binary reference recording signal $S_1$ (see FIG. 4A) that is fed from a reference recording signal generating circuit 16.

The laser diode 13 emits a laser beam of intensity proportional to the recording signal $S_2$ that is fed from the recording light amount control circuit 15. The laser beam emitted from the laser diode 13 is collimated by a collimator lens 14, and then passed through a beam splitter 16 to a mirror 7, from which the laser beam is reflected at right angles. The collimated laser beam reflected from the mirror 7 is again converged by an object lens 6 and irradiated on the optical disk 1. Thus, the optical disk 1 is recorded in cooperation with a magnetic circuit not shown to form recorded pits (magnetized pits) thereon.

On the other hand, the laser beam for reading is irradiated on the optical disk 1 and reflected from the optical disk 1 with the recorded pits. The reflected laser beam is passed through the object lens 6, the mirror 7, the beam splitter 16 and a condenser 17 and incident on a photodiode 21.

The output signal from the photodiode 21 is supplied to a reproduction circuit 22. When the output signal from the photodiode 21 is supplied to the reproduction circuit 22, the information recorded on the optical disk 1 is supplied therefrom as a reproduced signal $S_4$ ($S_{41}$ through $S_{43}$) (see FIGS. 4C through 4E) to a symmetry detecting circuit 23 as comparing means.

The symmetry detecting circuit 23 supplies a duty-ratio data $S_5$ according to the reproduced signal $S_4$ to the system controller 10.

The system controller 10 analyzes the duty-ratio data $S_5$ by an optimizing routine 25 as optimizing means which will be described in detail later. The analyzed data as the control signal $S_3$ is supplied to the recording light amount control circuit 15. The control signal $S_3$ can be optimized by repetitive execution of this optimizing routine 25.

The optimization of the control signal $S_3$, or the optimization of the amount P of emitted light from the laser diode 13 is performed within the try-to-write region 4 of the optical disk 1. That is, in the try-to-write region 4, the control signal $S_3$ is optimized for, for example, the linear velocity $LV_1$ at the innermost periphery, or radius $R_1$ of the rewritable region 2 and for the linear velocity $LV_2$, at the outermost periphery, or radius $R_2$.

The optimization for all positions in the radius direction within the rewritable region 2 is performed by the interpolation processing such as the linear interpolation according to an interpolation routine 26 or a predetermined functional interpolation.

The predetermined function should be selected to be, for example, a function exhibiting the average characteristic of the characteristics (hereinafter referred to as the optimum recording light amount characteristics, if necessary) of the radius vs. optimum control signal $S_3$ (corresponding to the optimum recording light amount) which are measured for CAV at all points in the radius direction A in reference tests, e.g. in which a plurality of optical disks 1 are rotated at a constant angular velocity (CAV). The function for interpolation may be function proportional to a half power of the linear velocity LV.

Thus when the optimum recording light amount is determined by two linear velocities at two positions in the radius direction within the rewritable region 2, the rewritable region between the radii corresponding to the two linear velocities can be determined by interpolation processing, and the rewritable region other than that between the radii corresponding to the two linear velocities can be determined by extrapolation.

The linear interpolation determines the optimum recording light amount from, for example, the linear velocity $LV_1$ at the innermost radius $R_1$ of the rewritable region 2 and the linear velocity $LV_2$ at the outermost radius $R_2$. The linear interpolation may determine the optimum recording light amount from the linear velocity $LV_3$ at a radius $R_3$ $\{R_3=R_1+(R_2-R_1)/2\}$ between the radii, $R_1$ and $R_2$ and the other two linear velocities, or the three linear velocities $LV_1$, $LV_2$ and $LV_3$. This linear interpolation using three linear velocities can provide a much higher precision than that using two linear velocities.

The characteristics of the linear velocity LV vs. optimum control signal $S_3$, or the optimum recording light amount characteristics determined by the interpolation routine 26 are stored in an optimum recording light amount table 27.

Therefore, the optical disk 1 can be recorded over all the rewritable region 2 by the optimum amount of recording light according to this optimum recording light amount table 27.

Figure 5:
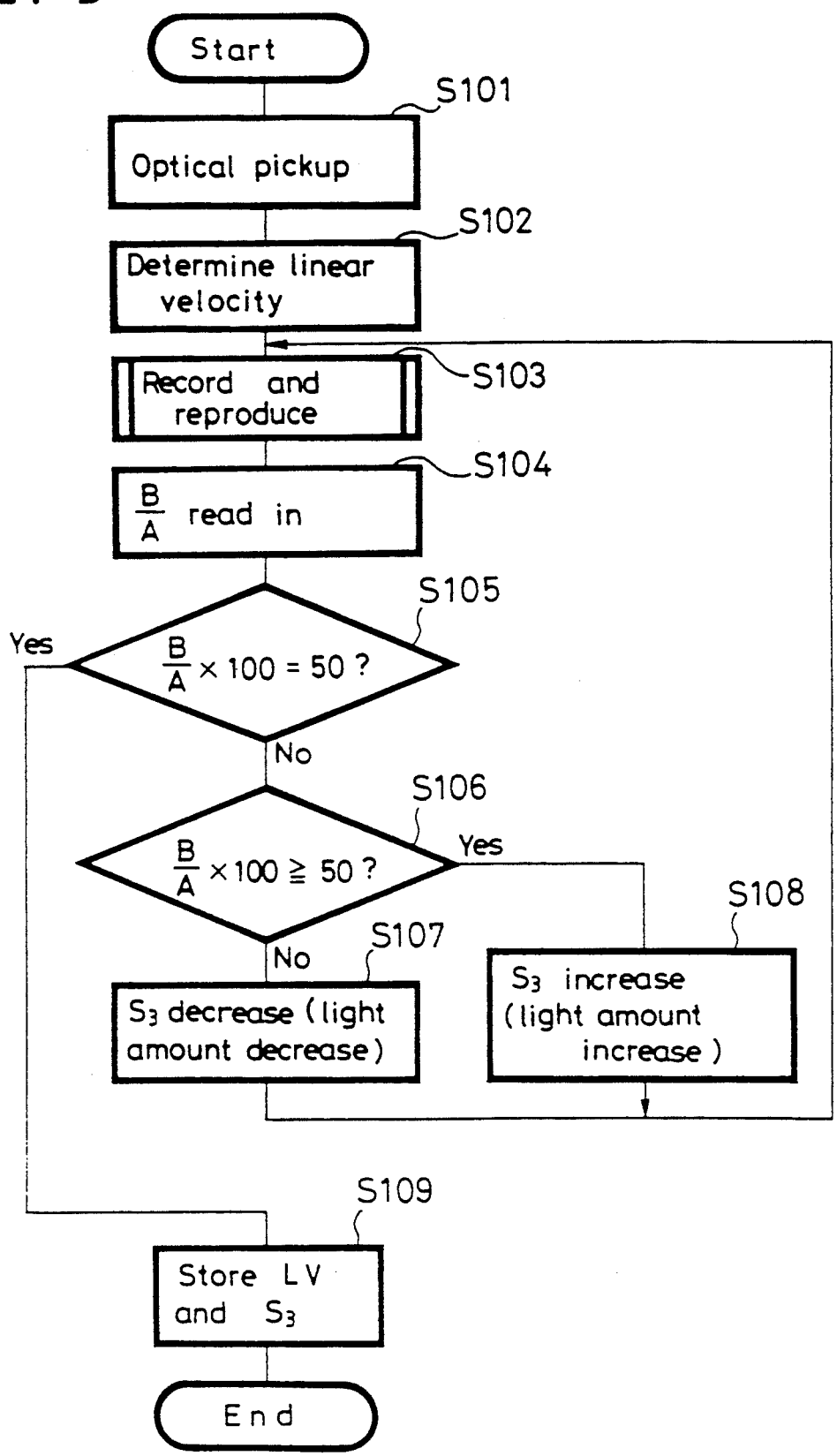
FIG. 5 is a flowchart to which reference is made in explaining the operation of the optical disk recording and reproducing apparatus shown in FIG. 1.

The operation of this embodiment, particularly the optimizing routine 25 will be described in detail with reference to the flowchart of FIG. 5.

After detecting that the optical disk 1 has been loaded on the shaft of the spindle motor 3, the system controller 10 controls the feeding motor 9 to move the optical pickup 5 in the radius direction A toward the centre and to position it at a point within the try-to-write region 4, for example, at the radius $R_0$ (step S101). The radius data $D_R=R_O$ can be confirmed by the output data from the encoder of the feeding motor 9.

Then, the system controller 10 refers to the velocity command table 11 (see FIG. 3) and supplies the velocity control signal Sv to the spindle motor 3, thereby controlling the motor to rotate the disk so that the linear velocity at the radius $R_0$ equals the recording linear velocity $LV_1$ for the radius $R_1$ (step S102). The linear velocity, $LV_{01}$ at radius $R_0$ can be made coincident with the linear velocity $LV_1$ at radius $R_1$ by supplying the velocity signal Sv which satisfies the relation of $LV_{01}=(R_1/R_0) LV_0=LV_1$.

The system controller 10 then sets the control signal $S_3$ to a certain value and supplies it to the recording light amount control circuit 15. In this case, the reference recording signal $S_1$ shown in FIG. 4A is supplied from the reference recording signal generating circuit 16 to the recording light amount control circuit 15. Thus, the recording signal $S_2$ of which the amplitude is determined by the control signal $S_3$ as shown in FIG. 4B is supplied to the laser diode 13. The laser beam modulated by the recording signal $S_2$ is irradiated from the laser diode 13 on the optical disk 1, recording pits thereon. Then, the reading laser beam is irradiated on the optical disk 1, and the reflected laser beam from the recorded pits are read by the photodiode 21. The reproduction circuit 22 produces the reproduced signal $S_4$ (step S103). Examples of reproduced signals $S_4$ for different recording light amounts are shown in FIG. 4C, D and E. (Although for simplicity the recording signals and optimum reproduced signal are shown as symmetrical, in practice they may not be symmetrical but this can be allowed for in the subsequent detection circuitry).

The reproduced signal $S_4$ is supplied to the symmetry detecting circuit 23. The symmetry detecting circuit 23 produces, for example, the duty ratio data $S_5$ ($S_5=B/A$) of the period of the reference level $V_R$ to that of the maximum level $V_{MAX}$ of the reproduced signal $S_4$, in which case the reference level is ½ the maximum level. The system controller 10 reads in this duty ratio Shd 5 ($S_5=B/A$) (step S104), and decides whether the read-in duty radio data $S_5$ ($S_5=B/A$) is 50% (or whatever is optimum) (step S105).

If it is not 50% (or optimum) at step 105, decision is further made of whether it is above 50% (step 106).

In the case of signal $S_{41}$ where the recording light amount was too large, since the reproduced signal $S_4$ is the reproduced signal $S_{41}$ shown in FIG. 4C, the ratio is 50% or below. In other words, the recording laser beam based on the recording signal $S_2$ and which is generated from the laser diode 13 is found to be too intensive. Thus, the control signal $S_3$ is reduced in its intensity by a predetermined amount and that intensity-reduced control signal $S_3$ is fed to the recording light amount control circuit 15 so that the control signal $S_2$ is reduced by a predetermined amount (step S107).

If the reproduced signal $S_4$ produced from the reproduction circuit 22 is a reproduced signal $S_{42}$ as shown in FIG. 4E, the duty ratio data $S_5$ ($S_5=B/A$) fed to the system controller from the symmetry detecting circuit 23 is 50% or above. In this case, the control signal $S_3$ is increased by a predetermined amount, and the intensity-increased control signal $S_3$ is supplied to the recording light amount control circuit 15, thus increasing the recording signal $S_2$ by a predetermined amount (step S108).

When the duty ratio data $S_5$ ($S_5=B/A$) reaches 50% after repetition of steps S103 through step S108, the reproduction circuit 22 produces the reproduced signal $S_4$ as a reproduced signal $S_{42}$ which is, as shown in FIG. 4D, substantially symmetric with respect to the intersection, F between the reference level $V_R$ and the reproduced signal $S_4$. When the recorded information is reproduced on the basis of the reproduced signal $S_4$ of which the duty ratio data $S_5$ ($S_5=B/A$) is 50%, it has the minimum loss of data. In this case, little error occurs, thus improving the reliability.

In this way, the decision at step S105 is "yes", and the value of the optimum control signal $S_3$ is determined under the condition that the linear velocity at radius $R_0$ within the try-to-write region 4 is equal to the linear velocity $LV_1$ at radius $R_1$, or $LV_{01} = (R_1/R_0) LV_0 = LV_1$. This value is also stored in memory means, though not shown, within the system controller 10 (step S109).

Similarly, the value of the optimum control signal $S_3$ is determined under the condition that the linear velocity at radius $R_0$ is equal to the recording linear velocity $LV_2$ for radius $R_2$, or $LV_{02} = (R_2/R_0) LV_0 = LV_2$. This value is also stored in memory means, though not shown, within the system controller 10.

Then, in use, the system controller 10 can determine the values of the optimum control signal $S_3$ for all linear velocities LV (i.e. all radii) in the rewritable region 2 by interpolation processing according to the interpolation routine 26.

Figure 6:
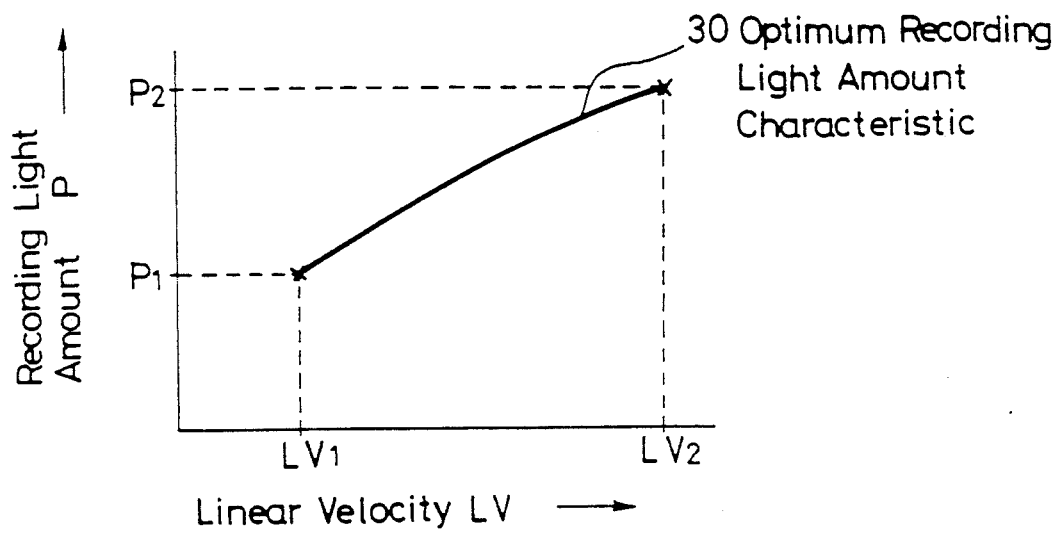
FIG. 6 is a graph showing the optimum recording light amount characteristic obtained by the optical recording and reproducing apparatus shown in FIG. 1.

FIG. 6 shows a curve of the optimum control signal $S_3$ determined by this interpolation processing, or an optimum recording light amount characteristic 30. This shows a functional interpolation between the optimum recording light amount P1 associated with the optimum control signal $S_3$ determined at the linear velocity $LV_{01}$ corresponding to linear velocity $LV_1$ and the optimum recording light amount P2 associated with the optimum control signal $S_3$ determined at the linear velocity $LV_{02}$ corresponding to linear velocity $LV_2$. A curve may by more suitable than straight linear interpolation for certain types of disk, e.g. MO disks with low melting and Curie temperature.

Thus, according to this embodiment, when information is recorded on the try-to-write region 4 on the inside of the innermost periphery of the rewritable region 2 of the optical disk 1 in order to determine the optimum recording light amount in the rewritable region 2, the optical disk 1 is rotated at linear velocities $LV_{01}$, $LV_{02}$ corresponding to the linear velocities $LV_1$, $LV_2$ at least at two radii, for example, $R_1$, $R_2$ of the rewritable region 2 in the radius direction of the optical disk 1. Under this condition, the optimum recording light amounts $P_1$ and $P_2$ are measured, and the values of the optimum recording light amount at all points within the rewritable region 2 of the optical disk 1 are determined by the interpolation or extrapolation processing according to the interpolation routine 26. Therefore, the values of the optimum recording light amount for all linear velocities LV in the rewritable region 2 of each optical disk 1 can be determined in a relatively short time.

This invention is not limited to this embodiment, but of course may take other various constructions without departing from the scope of the invention as defined by the claims.

I claim:

1. Optical disk recording apparatus comprising:
   a disk drive for rotating an optical disk;
   a light source for recording information on the optical disk;
   recording light amount control means for controlling an amount of light emitted by said light source during recording;
   reproduction means for reproducing recorded information to produce a reproduced signal;
   system control means for controlling said light source and said recording light amount control means to record first and second test data in a predetermined test region of the disk while controlling said disk drive to rotate the disk during recording of said first and second test data at respective first and second different angular velocities such that linear velocities of the test region at said first and second angular velocities are equal to linear velocities of two different radial positions of the disk during information recording, and for controlling said reproduction means to reproduce the first and second test data and for determining respective first and second optimized recording light amounts in accordance with the reproduced first and second test data;
   said system control means comprising computing means for computing recording light amounts for other radial positions on the disk from the first and second optimized recording light amounts; and
   means for setting recording light amount used in information recording in accordance with the reproduced first and second test data.

2. Apparatus according to claim 1, wherein the linear velocities of two different radial positions correspond to linear velocities of portions of the disk substantially at inner and outer peripheries of a user's recordable region when the disk is rotated at an angular velocity for information recording.

3. Apparatus according to claim 1, wherein said system control means determines optimized recording light amounts by a recursive process of recording the first and second test data, reproducing the first and second test data and adjusting the recording light amount and repeating as necessary.

4. Apparatus according to claim 1, wherein said system control means is adapted to control said disk drive to rotate the disk at the first angular velocity to determine the optimal first recording light amount and then at the second angular velocity to determine the optimized second recording light amount.

5. Apparatus according to claim 1, wherein said system control means also controls said disk drive, said light source and said recording light amount control means to record third test data while rotating the disk at a third angular velocity to determine a third recording light amount corresponding to a third radial position of the disk.

6. Apparatus according to claim 1, wherein said computing means computes the recording light amounts for other radial positions by interpolation or extrapolation from the determined recording light amounts.

7. Apparatus according to claim 6, wherein the interpolation or extrapolation is linear.

8. Apparatus according to claim 6, wherein the interpolation or extrapolation is based on a function of the half power of the linear velocity of the recording region of the disk.

9. Apparatus according to claim 1, wherein the first and second test data comprises a square wave and said system control means optimizes the recording light amount by monitoring a duty ratio of time periods above and below a reference level in the reproduced first and second test data signal.

10. An optical disk recording method comprising the steps of:
   recording first and second test data on a test region of an optical disk using a light source while rotating the disk at respective first and second different angular velocities such that linear velocities of the test region undergoing recording are equal to linear velocities of two different radial positions of the disk used during information recording;
   reproducing the recorded first and second test data;

determining respective first and second optimized recording light amounts in accordance with reproduced first and second test data;

computing recording light amounts for other radial positions of the disk from the first and second optimized recording light amounts; and setting the recording light amount of the light source for information recording in accordance with the first and second test data, first and second optimized light recording amounts and computed light recording amounts.

11. Method according to claim 10, wherein the linear velocities of two different radial positions correspond to linear velocities of portions of the disk substantially at inner and outer peripheries of a user's recordable region when the disk is rotated at the angular velocity for information recording.

12. Method according to claim 10, wherein the optimized recording light amounts are determined by a recursive process including the steps of recording the first and second test data, reproducing the recorded first and second test data, and adjusting the recording light amount and repeating as necessary.

13. Method according to claim 10, wherein the disk is rotated at the first angular velocity to determine the optimal first recording light amount and then at the second angular velocity to determine the optimal second recording light amount.

14. Method according to claim 10, including the further step of recording third test data while rotating the disk at a third angular velocity and determining a third recording light amount corresponding to a third radial position of the disk.

15. Method according to claim 10, wherein the recording light amounts for other radial positions are computed by interpolation or extrapolation from the determined recording light amounts.

16. Method according to claim 15, wherein the interpolation or extrapolation is linear.

17. Method according to claim 15, wherein the interpolation or extrapolation is based on a function of the half power of the linear velocity of the recording region of the disk.

18. Method according to claim 10, wherein the first and second test data comprises a square wave and the optimization of the recording light amount comprises monitoring a duty ratio of time periods above and below a reference level in the reproduced test data signal.

* * * * *

UNITED STATES PATENT AND TRADEMARK OFFICE
CERTIFICATE OF CORRECTION

PATENT NO. : 5,309,419
DATED : May 3, 1994
INVENTOR(S) : Shigeaki Koike

It is certified that error appears in the above-indentified patent and that said Letters Patent is hereby corrected as shown below:

```
Col. 1, line 12, change "upon" to --for--
Col. 2, line 64, after "the" first occurrence,
        insert --optimum--
Col. 3, line 14, after "the" second occurrence,
        insert --invention;--
Col. 4, line 68, delete "," first occurrence
Col. 6, line 28, delete "Shd"
        same line, change "5" to --$S_5$--
```

In the Claims:

Col. 9, line 5, change "of" to --on--

Signed and Sealed this

Sixth Day of June, 1995

*Attest:*

BRUCE LEHMAN

*Attesting Officer*        Commissioner of Patents and Trademarks